United States Patent
Krüger et al.

(10) Patent No.: US 6,917,838 B2
(45) Date of Patent: Jul. 12, 2005

(54) OPEN-LOOP AND CLOSED-LOOP CONTROL METHOD, AND A CONTROL DEVICE FOR STARTING UP AND SHUTTING DOWN A PROCESS COMPONENT OF A TECHNICAL PROCESS

(75) Inventors: Klaus Krüger, Altrip (DE); Manfred Rode, Wiesloch (DE); Rüdiger Franke, Heidelberg (DE)

(73) Assignee: ABB Research Ltd., Zurich (CH)

( * ) Notice: Subject to any disclaimer, the term of this patent is extended or adjusted under 35 U.S.C. 154(b) by 6 days.

(21) Appl. No.: 10/174,067

(22) Filed: Jun. 17, 2002

(65) Prior Publication Data

US 2003/0009241 A1 Jan. 9, 2003

(30) Foreign Application Priority Data

Jun. 16, 2001 (DE) .......................................... 101 29 141

(51) Int. Cl.[7] ............................................. G05B 13/02
(52) U.S. Cl. ............................. 700/28; 700/29; 700/30; 700/31
(58) Field of Search ............................. 700/28–31, 42, 700/47–49

(56) References Cited

U.S. PATENT DOCUMENTS

| 4,639,853 A | | 1/1987 | Rake et al. | |
|---|---|---|---|---|
| 5,132,897 A | * | 7/1992 | Allenberg | 700/29 |
| 5,166,873 A | | 11/1992 | Takatsu et al. | |
| 5,396,415 A | * | 3/1995 | Konar et al. | 700/42 |
| 5,402,332 A | * | 3/1995 | Kopf | 700/29 |
| 5,682,309 A | | 10/1997 | Bartusiak et al. | |
| 6,056,781 A | * | 5/2000 | Wassick et al. | 703/12 |
| 6,207,936 B1 | * | 3/2001 | de Waard et al. | 219/497 |
| 6,438,430 B1 | * | 8/2002 | Martin et al. | 700/28 |
| 6,542,782 B1 | * | 4/2003 | Lu | 700/29 |

FOREIGN PATENT DOCUMENTS

| EP | 0 370 327 A2 | 5/1990 |
|---|---|---|
| EP | 0 462815 A2 | 12/1991 |

* cited by examiner

*Primary Examiner*—John Follansbee
*Assistant Examiner*—Aaron C Perez-Daple
(74) *Attorney, Agent, or Firm*—Laurence A. Greenberg; Werner H. Stemer; Ralph E. Locher

(57) ABSTRACT

An open-loop and closed-loop control method is described for starting up or shutting down a process component of a technical process. At least one manipulated variable that is fed to the process is formed by a control device and an upstream model-assisted pilot control. The pilot control contains an optimizer and a process model. The optimizer is fed at least one command variable for the technical process. At least one optimized model manipulated variable which the optimizer outputs is fed to a process model of the pilot control and, is added to at least one output variable of the control device to form the manipulated variable. A model output variable of the process model is fed to the control device as a set-point and fed back to the optimizer along with variables which cannot be measured in the technical process. A device for implementing the method is also described.

10 Claims, 4 Drawing Sheets

OPEN-LOOP AND CLOSED-LOOP CONTROL METHOD, AND A CONTROL DEVICE FOR STARTING UP AND SHUTTING DOWN A PROCESS COMPONENT OF A TECHNICAL PROCESS

BACKGROUND OF THE INVENTION

Field of the Invention

The invention relates to a closed-loop method and a control device for carrying out the method for starting up or shutting down engineering processes, for example in power stations.

Such methods are used, in particular, to determine important input variables, including previously calculated analog set-point guides, for example for fuel quantities, pressure set-points and steam temperatures, and for important manipulated variables of valves and bypass stations when starting up or shutting down process components in power stations, which include, in particular, steam generators with steam bypass stations and turbines.

Model methods are known which employ a mathematical model operated in parallel with the process to determine and correct command variables, in particular from Published, Non-Prosecuted German Patent Application DE 31 33 222 A1 and from the reference by G. Kallina, titled "Vorausschauender Freilastrechner für das optimale Anfahren von Dampferzeugern" ["Look-Ahead Off-Load Computer For Optimum Start-Up Of Steam Generators"], VGB Kraftwerkstechnik 75 (1995), volume 7. A state observer is employed in this case which uses a simulator in order to obtain faster information on the thermal stress profile from a differential temperature between inner and middle strands of a thick structural component. The state values are suitable for observing the limiting value profiles and the possible command values in the case of a second simulator. The second simulator then works approximately 10 times faster than the first simulator, and therefore faster than real time. The process data are determined continuously during start-up and shutdown.

It emerges clearly from the description of the mode of operation that the command variables are determined looking ahead for a limited time period. The fuel input is yielded by taking account of the prescribed limiting values. It may be pointed out in this case that water injection is not performed until the end of a start-up operation.

One disadvantage of the method presides in that an attempt is made to solve the control response and interference response simultaneously, thus rendering it impossible to obtain a control quality which can be achieved optimally. The long computer time required, which is caused by the use of a second simulator operating 10 times faster than real time, places correspondingly high performance requirements on the computer system used.

The start-up and shutdown curves made available by the model supplier or process supplier are mostly based on stationary considerations. Numerical optimization methods for improving the start up/shut down procedure are not used in this case.

SUMMARY OF THE INVENTION

It is accordingly an object of the invention to provide an open-loop and a closed-loop control method, and a control device for starting up and shutting down a process component of a technical process that overcome the above-mentioned disadvantages of the prior art methods and devices of this general type.

Starting from model methods that use a mathematical model operating in parallel with the process in order to determine and correct command variables, it is the object of the invention to use a control device to implement a mode of procedure in determining the important input variables when starting up or shutting down process components of technical processes, to decouple the control response and interference response in the process, and to achieve injection of optimum set-points during the process, in particular during start-up or shutdown.

With the foregoing and other objects in view there is provided, in accordance with the invention, an open-loop and closed-loop control method for starting up and shutting down at least one process component of a technical process. The method includes providing a model-assisted pilot control having an optimizer and a process model, feeding at least one command variable for the technical process to the model-assisted pilot control, and generating in the optimizer and outputting from the optimizer at least one optimized model manipulated variable. The process model of the model-assisted pilot control receives the optimized model manipulated variable as an input variable. At least one model output variable output by the process model is fed to a control device as a set-point. The control device is disposed downstream of the model-assisted pilot control. The at least one model output variable is fed back to the optimizer. Internal variables output from the process model are fed back to the optimizer. The optimized model manipulated variable is added to at least one output variable output by the control device to form at least one manipulated variable. The manipulated variable is fed to the technical process. The optimized model manipulated variable and the model output variable are fed from a look-up table during the start-up and the shutdown, or are formed repeatedly by the process model. The process model tracks the technical process. In the event of a change in the command variable, a control response of a device having the model-assisted pilot control, the control device and the technical process is decoupled from an interference response of the technical process in a case of effects due to interference.

The first step is to use optimizations and simulations carried out offline to investigate the potential for improvement using suitable set-point guides, in particular start-up curves, then to apply them to a real system. The calculated set-point guides are denoted below as model-assisted pilot controls. In this case, a rigorous, dynamic and mostly nonlinear modeling is combined with numerical optimization carried out offline, account being taken of process boundary and secondary conditions, in particular physical constraints of process engineering, which are then applied to the real process.

The optimum profile of the manipulated and command variables is first calculated in an offline calculation for the lower-level, conventional closed-loop control in order to achieve the aim of starting up at optimal cost under the given secondary conditions. In particular, account is also taken here of minimum fuel consumption as a secondary condition. A rigorous dynamic process model of the basic system is used in this case. An optimization criterion is applied thereto, and the optimum profiles of the optimization variables are calculated as a function of the prescribed secondary conditions.

A quality function is formulated after the determination of the non-measurable variables by a sufficiently accurate model of the process considered by using mathematical and physical methods, or by evaluating measured parameters and structural features of the real process. The quality function is minimized or maximized with the aid of a suitable numerical optimization method in the optimizer, which makes explicit use of the mathematical process model. The process boundary and secondary conditions to be considered, which must be observed in the optimization, are also used in this case. The result is optimized set-points for the input variables of the process model which are considered. The result of the optimization yields the parameters of the process considered. After checking the calculated set-points by simulation using the process model (offline) they are injected during start-up or shutdown of the real process. In the case of systems already in operation, the process model is also identified from measurements or checked by such measurements. Again, there is a need in part for structural data of the process components, such as, for example, data on geometry and materials.

Optimizations and simulations carried out offline are used to investigate the potential for improvement by new set-point guides, for example by start-up curves, and then to apply it to the real system. The model-assisted pilot control yields an improvement in dynamics with reference to the control response, the pilot control not exerting an influence on the stability of the lower-level closed-loop control circuit. Two degrees of freedom therefore exist in the optimization of control response and interference response. The actuators are treated gently as a result, and the conventional closed-loop control circuit is relieved, since it need only compensate the deviation from the optimum profile. A further advantage consists in the possibility of configuring and optimizing the pilot control and closed-loop control independently of one another. If a controller is already optimally set with reference to the interference response, the possibility exists of producing a model-assisted pilot control without reparameterizing the controller.

Alongside the command variables, consideration is also given to interference of a model-assisted pilot control if the interference is available by measurement. A closed-loop control circuit in which the optimizer is used as a controller is employed for the higher-level online generation of command variables. The real time requirements are substantially reduced in this case, and the closed-loop control circuit need not necessarily be operated with the same sampling time as the lower-level closed-loop controls, since it is primarily only an adaptation of the originally calculated set-point profiles that takes place.

Advantages also result by comparison with the above-mentioned prior art (see Published, Non-Prosecuted German Patent Application DE 3 133 222 A1, and the reference by G. Kallina, titled "Vorausschauender Freilastrechner für das optimale Anfahren von Dampferzeugern") ["Look-Ahead Off-Load Computer For Optimum Start-Up Of Steam Generators"], VGB Kraftwerkstechnik 75 (1995), volume 7) by virtue of the fact that the thermal stress calculation can be carried out separately in the case of the method according to the invention.

If explicit account is taken of the fuel requirement in the optimization criterion, start-up can be done in a way that optimizes costs. The result of optimization can be that the water injection of the steam generator must go into operation during start-up. This effect can also affect the fuel requirement. In order to shorten the overall time for start-up and/or shutdown, and thus to reduce the fuel costs, use is also made of existing unused quantities, for example in the case of the nonstationary thermal stresses of thick-walled structural components.

In accordance with an added mode of the invention, the model-assisted pilot control is used to exert a corrective influence on the control device.

With the foregoing and other objects in view there is provided, in accordance with the invention, a A device for starting up and shutting down at least one process component of a technical process. The device contains a pilot control having an optimizer and a process model. The process model generates an optimized model output variable and the optimizer generates and outputs a model manipulated variable. A control device is disposed downstream of the pilot control and receives the optimized model output variable. The control device has an output outputting an output variable. An adder is disposed downstream of the control device and receives and adds the output variable from the control device and the model manipulated variable from the optimizer.

In accordance with a further feature of the invention, the pilot control has an input receiving known set-points and the process model is connected to the input and receives the known set-points. The pilot control has a pilot adder connected to the input, to the process model, and to the control device. The pilot adder receives and corrects the optimized model output variable and the known set-points, and the pilot adder outputs modified set-points to the control device.

Other features which are considered as characteristic for the invention are set forth in the appended claims.

Although the invention is illustrated and described herein as embodied in an open-loop and a closed-loop control method, and a control device for starting up and shutting down a process component of a technical process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
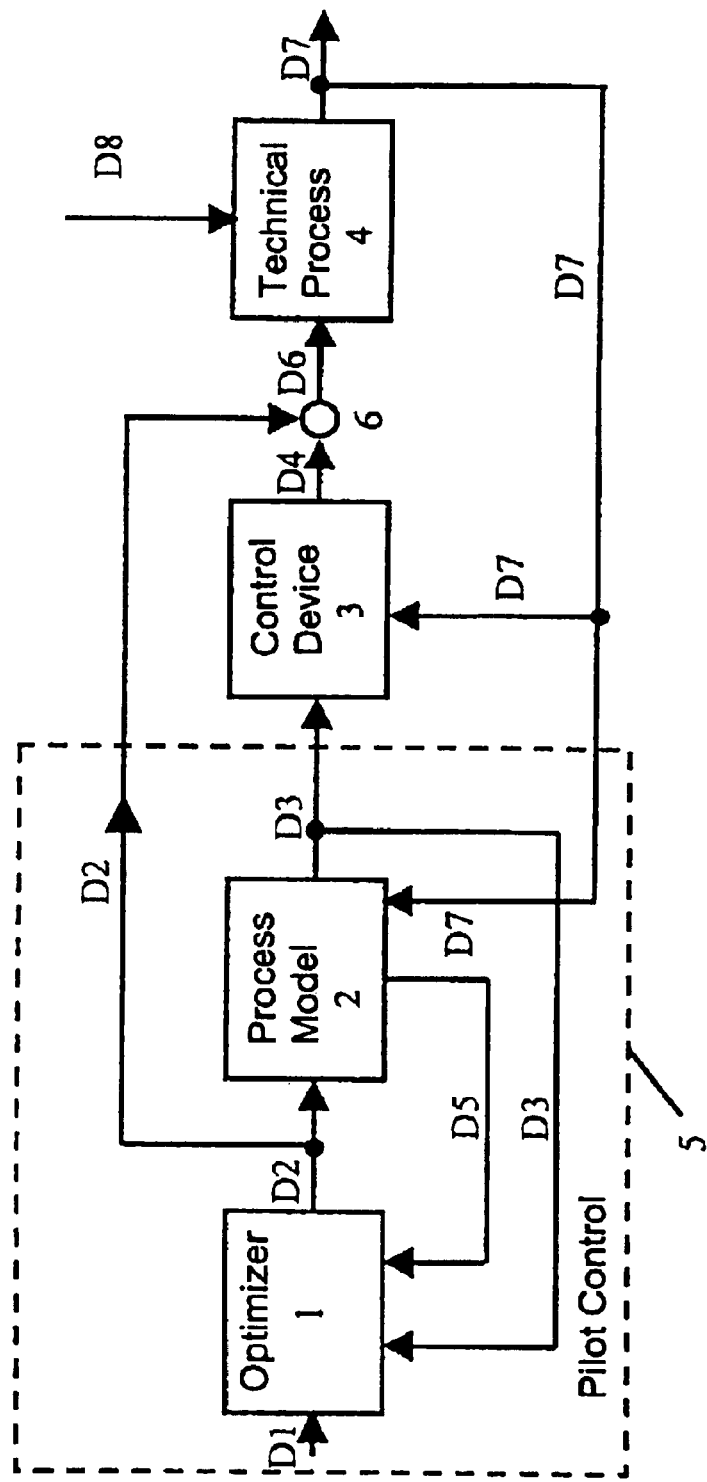
FIG. 1 is a block diagram of a control device with model-assisted pilot control according to the invention.

Referring now to the figures of the drawing in detail and first, particularly, to FIG. 1 thereof, there is shown a configuration according to the invention for carrying out a closed-loop control method for starting up or shutting down at least one process component of a technical or real process 4. A control device 3 is used to form at least one output variable D4, and at least one manipulated variable D2 is formed with the aid of an upstream model-assisted pilot control 5. The manipulated variable D2 is fed to the technical process 4 via an adder 6 that outputs a final manipulated variable D6.

The pilot control 5 along with at least one command variable D1, reproduces a target variable of an output variable D7 of the technical process 4. Consideration is also given to a model output variable D3 as a command variable for the control device 3. A distinction is made between two variant uses when applying the pilot control 5 in a particular case.

In the first case, the optimized model manipulated variable D2 and the model output variable D3, which reflect the current set-points for the real closed-loop controls, are present as numerical stipulations (for example look-up tables) which are calculated in advance, suitably stored and fed into the technical process 4 as the data stream D6 during start-up and/or shutdown.

In the second case, the optimization and simulation of the process model 2 is carried out repeatedly during start-up or shutdown. To this end, the process model 2 tracks the real system so that convergence is achieved between the model output variable D3 and the process output variable D7.

The pilot control 5, which includes an optimizer 1 and the process model 2, makes available the optimized model output variable D3 of the real closed-loop control, that is to say the control device 3. In the process, the optimizer 1 is fed the command variable D1 for the real process 4 and the optimized model set-point D2 is output and is fed to the process model 2 of the pilot control 5 as an input variable and is, furthermore, added to the output variable D4 of the control device 3 for the purpose of forming the final manipulated variable D6. The model output variable D3 of the process model 2 is fed to the control device 3 as a set-point and fed back, moreover, to the optimizer 1—along with internal variables D5, in particular ones which cannot be measured in the technical process 4.

The tracking of the process model 2 on the real process 4 for the second case is performed via the measurable process variables D7. It is thereby possible to eliminate deviations between the process model 2 and the real process 4, in particular upon the occurrence of interference D8 in the real process 4.

Figure 2:
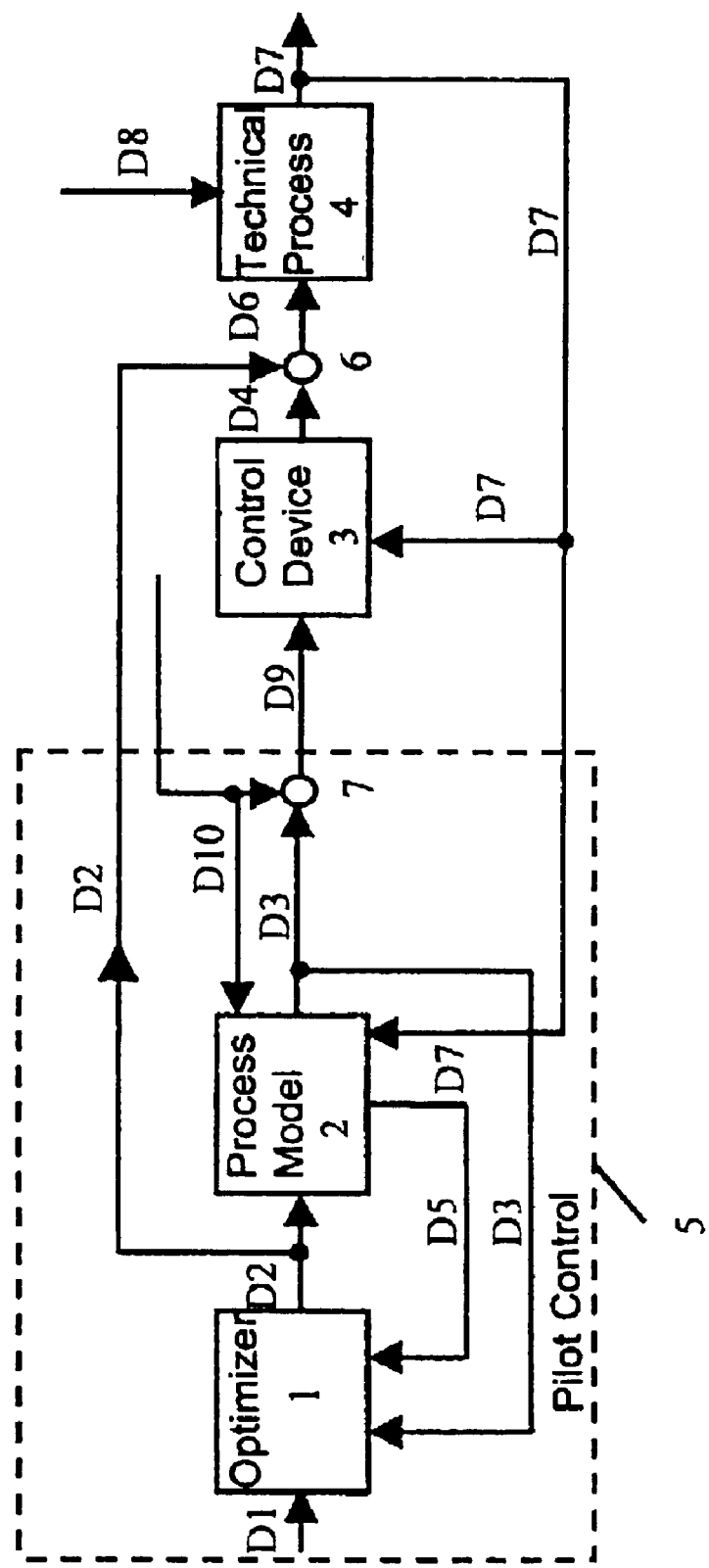
FIG. 2 is a block diagram of a second embodiment of the control device with existing set-points and model-assisted pilot control.

FIG. 2 shows the configuration according to the invention for the case in which the pilot control 5 is used for a process which already has available the control device 3 and known set-points D10. In this case, the set-points D10 already present must be fed to the process model 2. The model output variables D3 are then summed in an adder 7 (pilot adder) with the aid of the set-points D10 already present. Set-points D9 resulting therefrom are, finally, fed to the control device 3.

Figure 3:
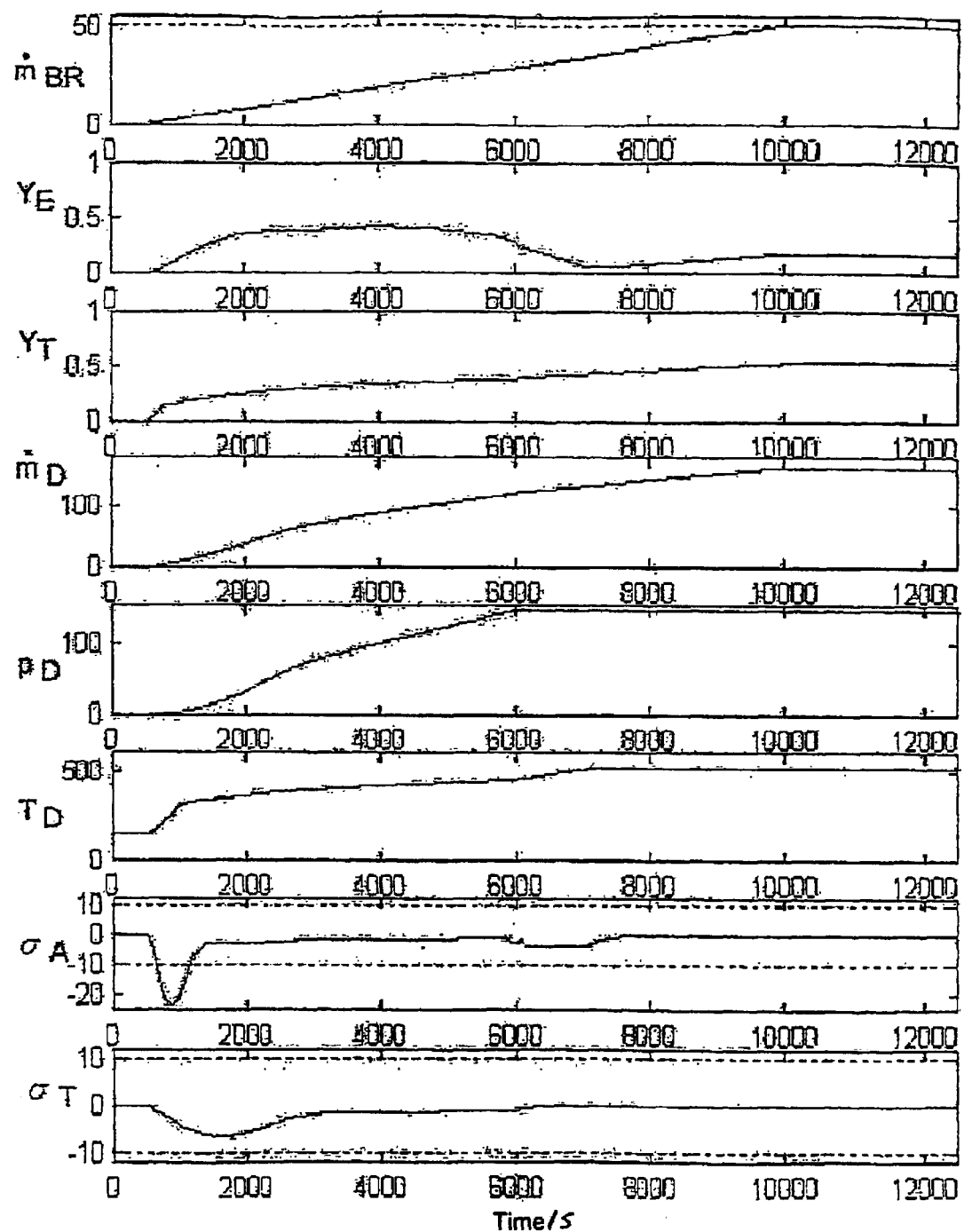
FIG. 3 is a graph of a simulation of a typical start-up of a steam generator.
Figure 4:
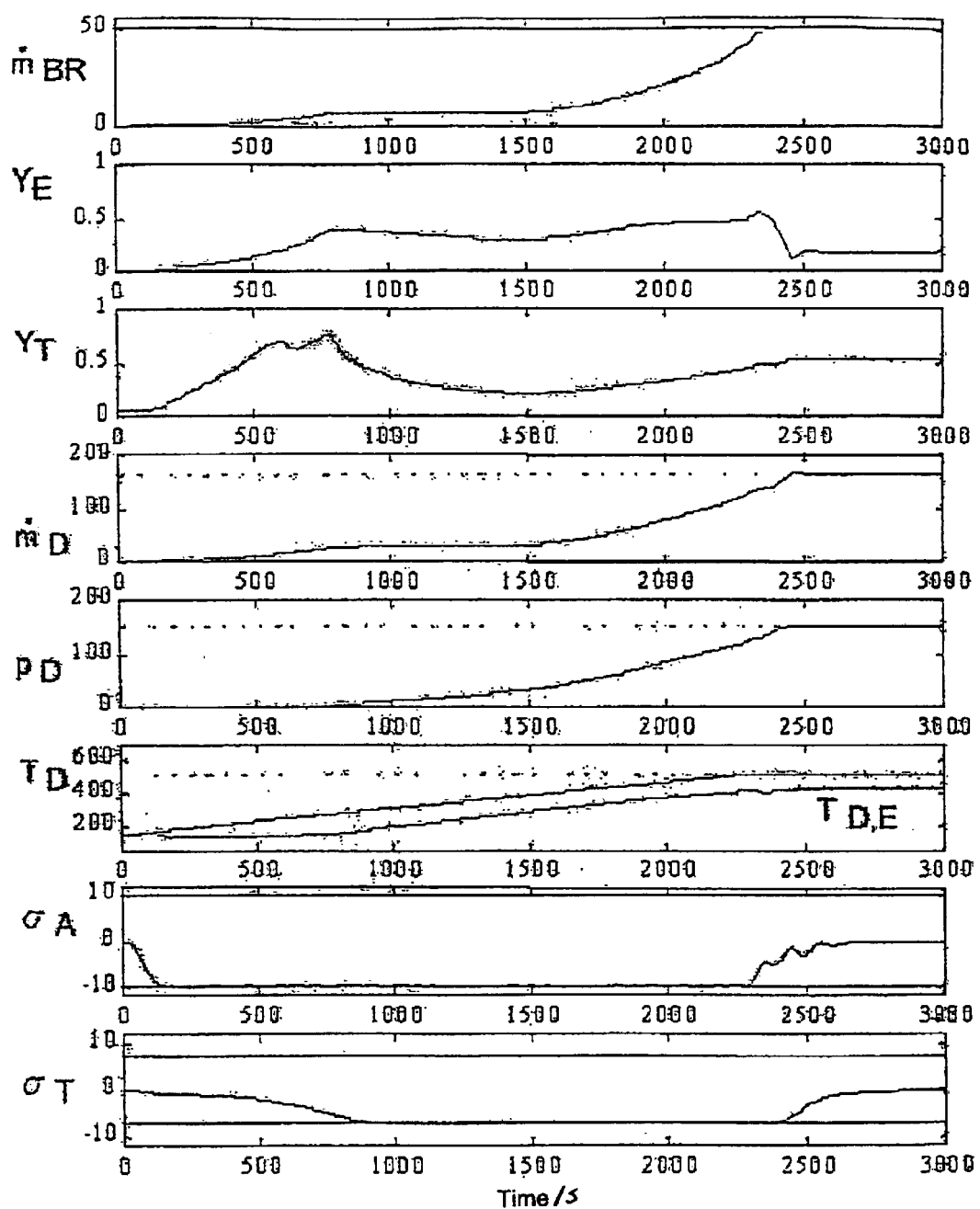
FIG. 4 is a graph of a simulation of an optimized start-up of the steam generator.

Legend to the illustrations of the curves in FIG. 3 and FIG. 4:

$\dot{m}_{BR}$: mass rate of fuel flow [kg/s];
$Y_E$: position of an injection control valve;
$Y_T$: position of a turbine bypass station;
$\dot{m}_D$: mass rate of steam flow at a boiler outlet [kg/s];
$p_D$: steam pressure at the boiler outlet [bar];
$T_D$: steam inlet temperature before the last superheating [C];
$\sigma A$: thermal stress at an outlet header [N/mm2]; and
$\sigma T$: thermal stress at a drum [N/mm2].

FIG. 3 illustrates the simulation of a typical start-up of a steam generator with the positions $Y_E$, $Y_T$ of the injection control valve and of the turbine bypass station. The fuel quantity $\dot{m}_{BR}$ is increased in this case in the shape of a ramp till 10,000 s. The aim is to raise the steam pressure $p_D$, the steam temperature $T_D$ and the steam quantity $\dot{m}_D$ starting from the stationary values $P_D \approx 0.1$ MPa, $T_D \approx 146°$ C. and $\dot{m}_D \approx 0$ kg/s to their target final values of 15 MPa for $p_D$, 520° C. for $T_D$ and 163 kg/s for $\dot{M}_D$. Plotted inter alia were two profiles for the thermal stresses $\sigma A$, $\sigma T$ of the outlet header. The long start-up time of 10,000 s results from the requirement to keep the thermal stresses within the permissible limits.

FIG. 4 shows a simulation for an optimized start-up of a steam generator while observing prescribed limits, which is terminated after 2,500 s, that is to say it takes place four times faster than the start-up illustrated in FIG. 3. Moreover, the fuel consumption, which is represented as the area below the curve of $\dot{m}_{BR}$ up to the attainment of the stationary values after 10,000 s in FIG. 3 or 2,500 s in FIG. 4, is approximately three times smaller in the case of the optimized start-up in FIG. 4 than in FIG. 3. In contrast with FIG. 3, the unused quantities for the thermal stresses ($\sigma A$, $\sigma T$) are fully exhausted. In this case, in accordance with FIG. 1 the optimized set-points for fuel, pressure and steam temperature as well as the pilot controls for the injection control valve and the turbine bypass station were injected for the simulation. A quality function (J) was minimized by a numerical optimization in the determination of these optimized set-point guides.

The quality function and the boundary and secondary conditions that have led to the optimum profiles in accordance with FIG. 4 will now be given by way of example. The following integral was selected as the quality function:

$$J = \int_{t_0}^{t_E} [w_{pD}, w_{TD}, w_{\dot{m}D}] \begin{bmatrix} [p_D(t) - p_{D,SW}]^2 \\ [T_D(t) - T_{D,SW}]^2 \\ [\dot{m}_D(t) - \dot{m}_{D,SW}]^2 \end{bmatrix} dt$$

In this case, the minimization of the quality function J was selected as an optimization target. The variables of the quality function have the following significance:

J: value of the integral over the weighted quadratic deviations;
$t_0$: instant when start-up begins;
$t_E$: instant when start-up ends;
$W_{PD}$: weighting factor for the quadratic deviation of steam pressure;
$W_{TD}$: weighting factor for the quadratic deviation of steam temperature;
$W_{\dot{m}D}$: weighting factor for the quadratic deviation of steam quantity;
$P_{D,SW}$: target set-point for the steam pressure;
$T_{D,SW}$: target set-point for the steam temperature;
$\dot{m}_{D,SW}$: target set-point for the steam quantity;
while observing the following boundary and secondary conditions:

0 [kg/s] $\leq \dot{m}_{BR} \leq$ 50.4 [kg/s];
0 [kg/s2] $\leq \ddot{m}_{BR} \leq$ 0.0053 [kg/s2] (monotonically rising fuel quantity);
0.05 < $Y_T \leq$ 1 (adjusting range of the turbine bypass);
0 $\leq Y_E \leq$ 1 (adjusting range of the injection control valve);
max$|\sigma_A| \leq$ 7 [N/mm2] (maximum value for the thermal stress at the outlet header);
max$|\sigma_T| \leq$ 10 [N/mm2] (maximum value for the thermal stress at the drum);
$T_{D,E}(t) > T_{satt} = f(p_D)$ (the steam inlet temperature upstream of the last superheating $T_{D,E}(t)$ should be higher than the saturated steam temperature $T_{satt}$, which is a function of the steam pressure $p_D$; and
$T_D(t) > T_{D,E}(t)$ (guaranteed superheating, that is to say the outlet temperature of the last superheating is higher than the inlet temperature).

The optimization variables are the fuel quantity $\dot{m}_{BR}$, the position of the turbine bypass station $Y_T$ and the position of the injection control valve $Y_E$. These variables correspond to the manipulated variables D2 in FIG. 1. The process model variables $\dot{m}_D$, $T_D$, $T_{D,E}$ and $p_D$ in FIGS. 3 and 4, which correspond to the model output variables D3 in FIG. 1, are determined by simulation, that is to say by connecting the manipulated variables D2 to the process model.

In practical applications, it is not only thermal stresses, but also temperature differences in the thick-walled structural component that are used. The temperature differences are detected by invasive thermocouples. The method presented can then be used in exactly the same way

We claim:

1. An open-loop or closed-loop control method for starting up and shutting down at least one process component of a technical process, which comprises the steps of:

providing a model-assisted pilot control having an optimizer and a process model;

feeding at least one command variable for the technical process to the model-assisted pilot control;

generating in the optimizer and outputting from the optimizer at least one optimized model manipulated variable, the process model of the model-assisted pilot control receiving the optimized model manipulated variable as an input variable;

feeding at least one model output variable output by the process model to a control device as a set-point, the control device disposed downstream of the model-assisted pilot control;

feeding the at least one model output variable back to the optimizer;

feeding internal variables output from the process model back to the optimizer;

adding the optimized model manipulated variable to at least one output variable output by the control device to form at least one manipulated variable;

feeding the manipulated variable to the technical process;

acquiring the optimized model manipulated variable and the model output variable from a look-up table during the start-up and the shutdown, or repeatedly forming the optimized model manipulated variable and the model output variable with the process model by feeding back an output of the technical process to the process model during startup and shutdown, to thereby track the technical process with the process model; and in an event of a change in the command variable, decoupling a control response of a device having the model-assisted pilot control, thereby preventing an interference response of the technical process in a case of effects due to interference.

2. The method according to claim 1, which comprises determining a model of the technical process in the optimizer by formulating a quality function using mathematical and physical methods, and wherein the quality function is maximized or minimized with an aid of a suitable optimization method.

3. The method according to claim 1, which comprises applying a combination of a rigorous dynamic modeling with an optimization to the technical process, taking account of boundary and secondary conditions.

4. The method according to claim 3, which comprises forming the boundary and secondary conditions to be physical constraints of process engineering.

5. The method according to claim 1, which comprises using at least one measurable output variable of the technical process for adjusting the process model.

6. The method according to claim 1, which comprises identifying the process model at least partially from measurements if the technical process is in operation.

7. The method according to claim 1, which comprises performing an injection before completion of the start-up, to permit the start-up at optimum cost while observing existing constraints if the process component is a steam generator with water injection.

8. The method according to claim 1, which comprises using the model-assisted pilot control to exert a corrective influence on the control device.

9. The method according to claim 1, which comprises forming the internal variables from variables that cannot be measured in the technical process.

10. The method according to claim 1, which comprises checking the process model using measurements if the technical process is in operation.

* * * * *